Figure 1:
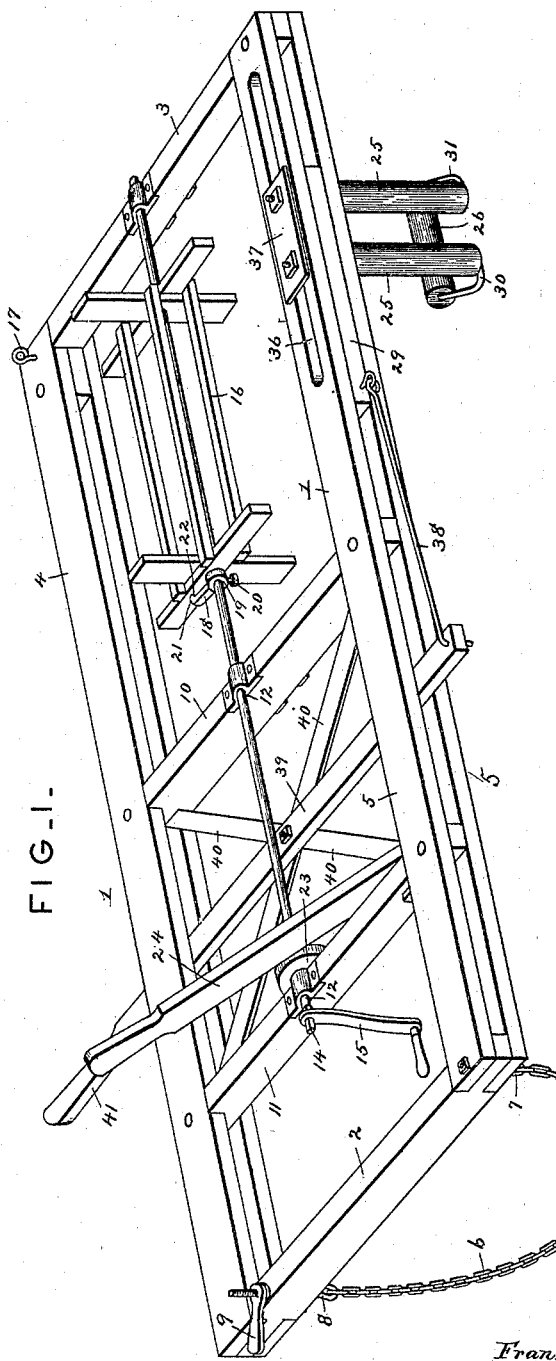

(No Model.) 2 Sheets—Sheet 1.
F. N. HOFFSTAEDT & J. F. SPRINGER.
REEL CARRIER.

No. 489,742. Patented Jan. 10, 1893.

Witnesses
Harry L. Ames
N. J. Riley

Inventors
Frank N. Hoffstaedt
James F. Springer
By their Attorneys,
C. A. Snow & Co.

(No Model.) 2 Sheets—Sheet 2.
F. N. HOFFSTAEDT & J. F. SPRINGER.
REEL CARRIER.
No. 489,742. Patented Jan. 10, 1893.
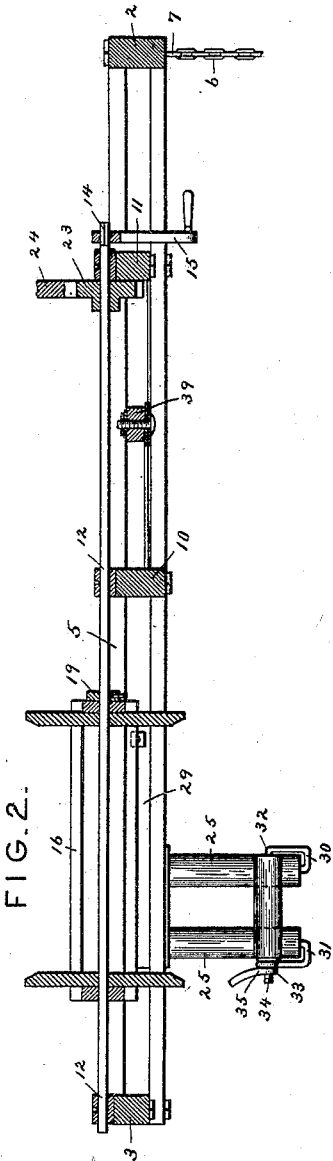
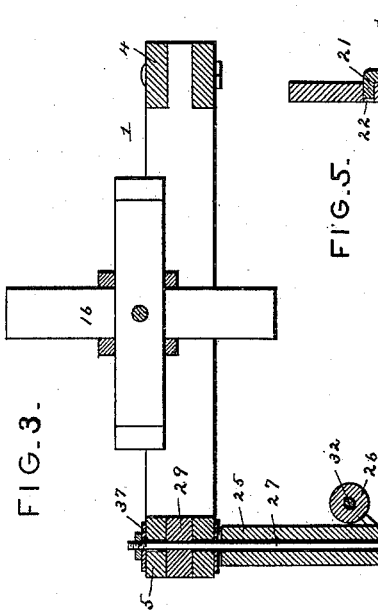
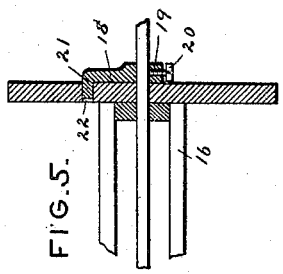
Witnesses
Harry L. Amer
N. S. Riley
Inventors
Frank N. Hoffstaedt
James F. Springer
By their Attorneys,
C. A. Snow & Co.

UNITED STATES PATENT OFFICE.

FRANK N. HOFFSTAEDT AND JAMES F. SPRINGER, OF FIRTH, NEBRASKA.

REEL-CARRIER.

SPECIFICATION forming part of Letters Patent No. 489,742, dated January 10, 1893.

Application filed June 6, 1892. Serial No. 435,693. (No model.)

*To all whom it may concern:*

Be it known that we, FRANK N. HOFFSTAEDT and JAMES F. SPRINGER, citizens of the United States, residing at Firth, in the county of Lancaster and State of Nebraska, have invented new and useful Improvements in Reel-Carriers, of which the following is a specification.

The invention relates to improvements in reel carriers.

The object of the present invention is to simplify and improve the construction of wire reel carriers, to enable wire to be collected and reeled evenly on a spool, and to be paid out for fencing as desired.

A further object of the invention is to facilitate the attachment of a spool and to enable any size spool to be readily employed.

The invention consists in the construction and novel combination and arrangement of parts hereinafter fully described, illustrated in the accompanying drawings and pointed out in the claims hereto appended.

In the drawings—Figure 1 is a perspective view of a reel carrier constructed in accordance with this invention. Fig. 2 is a longitudinal sectional view. Fig. 3 is a transverse sectional view. Fig. 4 is a detail sectional view, showing the slide. Fig. 5 is a similar view showing the spool clutch.

Like numerals of reference indicate corresponding parts in all the figures of the drawings.

1 designates a rectangular frame designed to be mounted on a vehicle and arranged longitudinally of the same and composed of end bars 2 and 3 and parallel side bars 4 and 5 adapted to be secured on a wagon body by a chain 6 having one end attached to an eye bolt 7, and adapted to have any one of its links engage a screw bolt 8 which is provided with a handle 9 having a threaded opening to engage the screw hook and adapted to draw the hook portion against the frame to close the mouth and confine a link of the chain. The frame is connected intermediate its ends by cross-bars 10 and 11 which are provided with bearings in which is journaled a longitudinal spool carrying shaft 12 which is also journaled in a bearing plate of the end bar 3 and which has its inner end 14 squared and engaged by a handle 15 by means of which the shaft is rotated and wire wound on a spool 16. The spool is arranged in the space between the end bar 3 and the cross-bar 10 and it is inserted on the end of the shaft by removing a pin 17 and releasing one end of the bar 3 which is hinged at its other end and is adapted to swing outward to free the outer end of the longitudinal shaft to permit a reel to be placed on the latter or removed therefrom. The spool 16 is secured rigid with the shaft by a spool-clutch 18 which consists of a bar provided at its inner end with an eye 19 to receive the shaft, and a set screw 20 to engage the same, and provided at its outer end with a lug 21 which fits into a perforation 22 of the inner end of the spool. The spool clutch is adjusted along the shaft to suit the length of the spool and is made rigid with the same, and the lug is brought in engagement with the perforation of the spool, thereby rigidly connecting the spool with the shaft.

In paying out the wire for erecting fences, the speed of the shaft is regulated by a brake consisting of a friction wheel 23 secured to the shaft and arranged adjacent to the cross-bar 11 and provided with an annular shoulder or enlarged hub and a brake lever 24 fulcrumed at one end on the frame and provided at its other end with a handle and adapted to bear against the friction wheel to retard the motion of the shaft.

The wire is guided to the spool to enable the winding to be even by a reciprocating guide consisting of vertical rolls 25 and a horizontal roll 26. Rolls 25 are mounted on vertical rods 27 and 28 depending from the slide 29 and provided at their lower ends with inward bends forming arms 30 and 31; and the arm 30 is provided with a horizontal extension 32 on which the horizontal roll 26 is arranged. The arm 31 is provided with an eye 33 which receives the threaded end 34 of the extension 32, and the parts are secured together by a handle 35 which is provided with a threaded opening to screw on the threaded end of the extension and to operate as a nut. The slide is arranged between the parallel bars 5 which are provided with longitudinal slots 36 to receive the rods, which have their upper ends threaded and provided with nuts and a sliding plate 37 is interposed between the nuts and the upper bar 5. The inner end of the slide is connected by a rod 38 with an end of an oscillating lever 39 which is fulcrumed on diagonally disposed bars 40 which cross each other and have their ends secured to the frame.

The crank handle and the brake lever, and the handle end 41 of the oscillating lever are arranged within convenient reach so that a man may control them from one side of the frame.

It will be seen that the reel carrier is simple and comparatively inexpensive in construction, that it is adapted for the reception of different sizes of spools, and that the wire may be controlled without coming in contact with the animals of a vehicle. It will also be apparent that the rollers will enable the barbs of wire to pass by them without injury.

A wire may be readily placed in the guide or removed therefrom by detaching the handle from the threaded end of the extension and withdrawing the latter from the eye of the arm.

Any size of spool may be employed as a spool is arranged between the hinged end bar 3 and the adjustable spool clutch, the latter being adapted to be shifted along the shaft to accommodate spools of different sizes.

What we claim is—

1. In a reel, the combination of a frame adapted to be carried by a vehicle and provided at one side with longitudinal slots, a shaft journaled on the frame, a spool mounted on the shaft, a reciprocating slide arranged in the frame and a guide depending from the slide and comprising rollers, and a frame carrying the rollers and having the upper ends of the sides arranged in the slots and secured to the slide, and means for reciprocating the slide, substantially as described.

2. In a reel, the combination of a frame having parallel side bars 4 and 5, the side bars 5 being provided with longitudinal slots, a shaft, a reel mounted on the shaft, a slide arranged between the side bars 5, a lever fulcrumed on the frame, a rod connecting the lever with the slide and a wire guide consisting of a frame having the upper ends of its sides arranged in said slots and secured to the slide and vertical and horizontal rolls, substantially as described.

3. In a reel, the combination of a frame having parallel side bars 4 and 5, the latter being provided with longitudinal slots, a shaft, a spool mounted on the shaft a slide arranged between the side bars 5, a guide carried by the slide and comprising a frame having vertical side rods arranged in said slots and provided at their lower ends with inwardly extending arms, one of the arms being provided with an eye and the other having a horizontal extension arranged in the eye and threaded, a handle having a threaded opening arranged on the threaded end of the extension, vertical rolls arranged on the side rods, and a horizontal roll arranged on the extension, and means for reciprocating the slide, substantially as described.

In testimony that we claim the foregoing as our own we have hereunto affixed our signatures in the presence of two witnesses.

FRANK N. HOFFSTAEDT.
JAMES F. SPRINGER.

Witnesses:
   T. R. BURLING,
   CHAS. SPRINGER.